Patented May 11, 1943

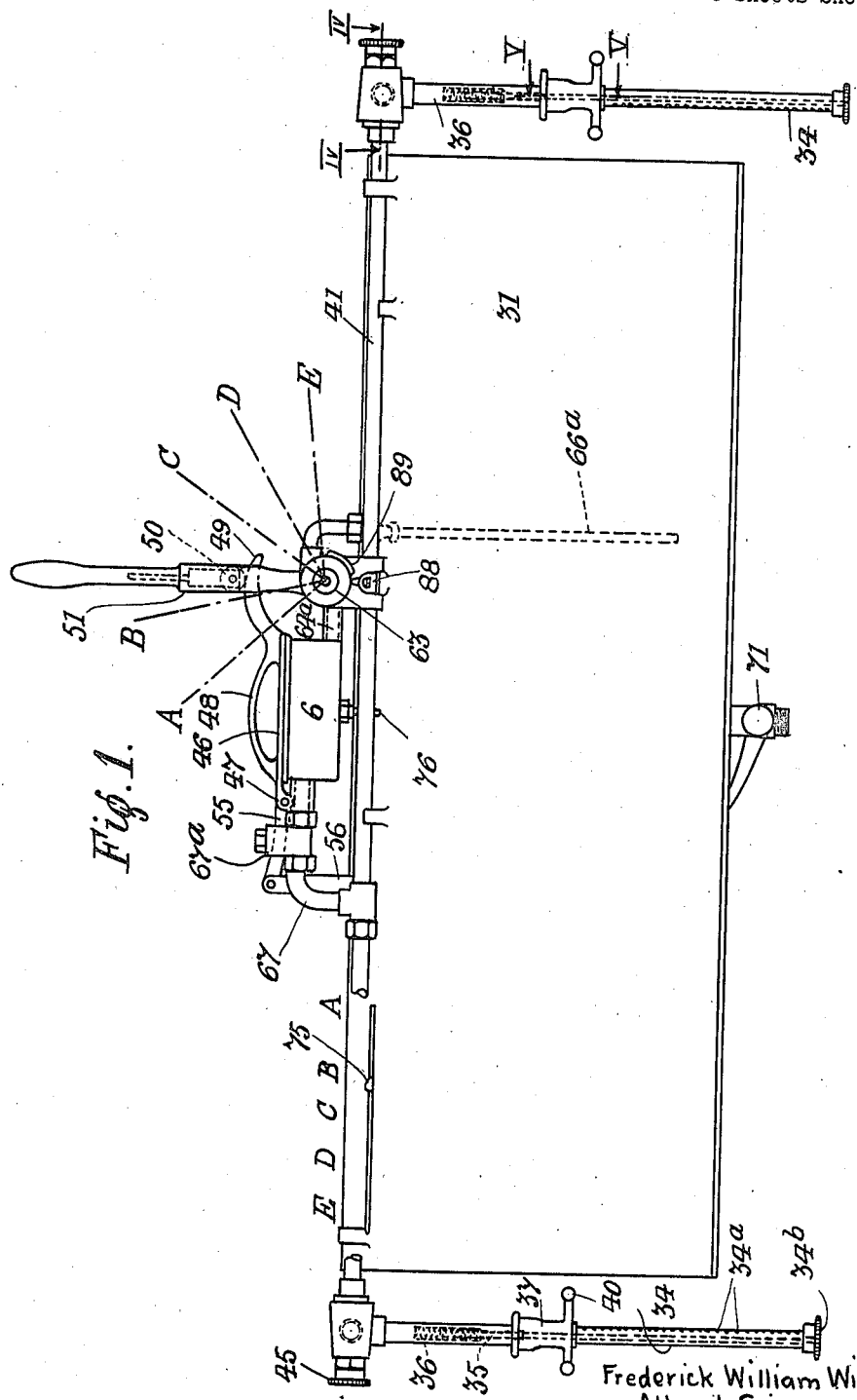

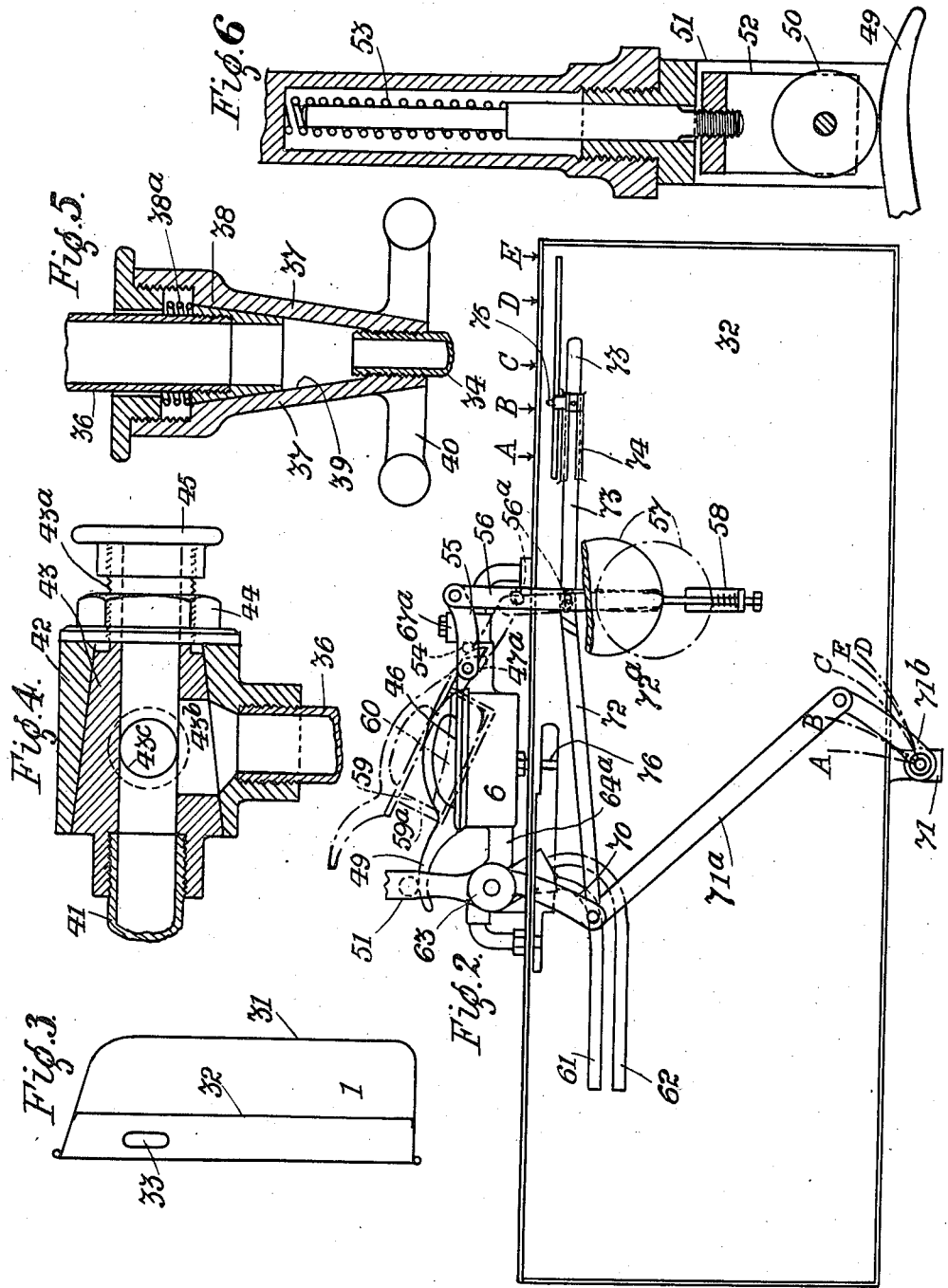

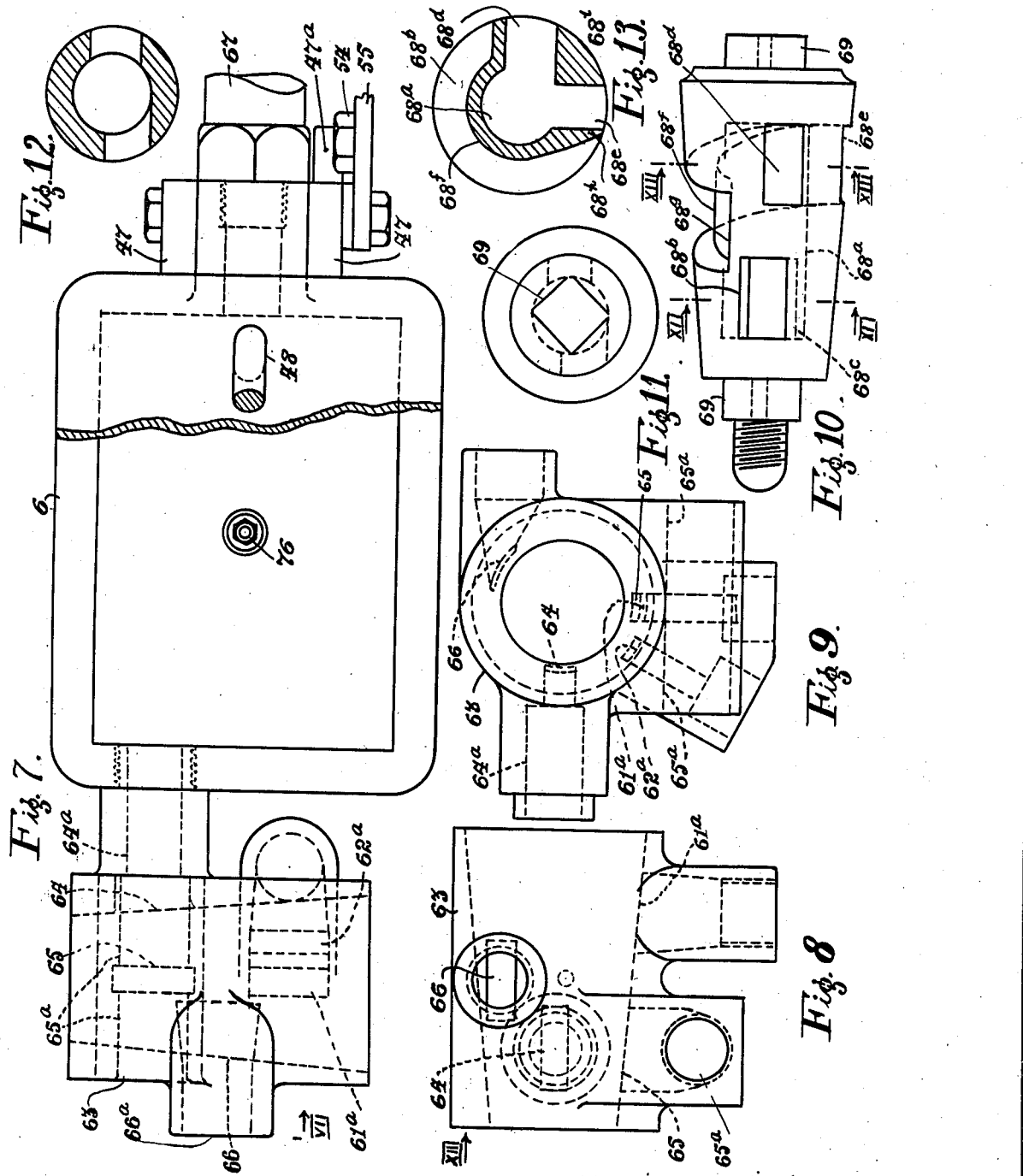

2,318,826

UNITED STATES PATENT OFFICE 2,318,826

MEANS FOR PRODUCING A BATH LIQUID, SPRAY, OR THE LIKE

Frederick William Willis and Albert Simpson, Belfast, Northern Ireland

Application December 20, 1939, Serial No. 310,142
In Great Britain March 14, 1938

14 Claims. (Cl. 299—84)

This invention relates to apparatus for the production of an aerated or gasified spray or foam, which may be produced as a simple water spray or as a saponified, medicated, disinfectant, of other mixture or solution and which may be provided for any desired purpose. It also relates to apparatus for use with baths or the like for producing solutions whether aerated or not.

One object of the invention is to provide shower producing apparatus comprising a mixing chamber constituting also a receptacle for substance which is a reagent with water, a gas-displacement-container, a passage between said container and said chamber allowing passage of gas from the former to the latter, a shower-delivery device, a control valve, inlets to said valve respectively for hot water and cold water, a first outlet from said valve to said container, a second outlet from said valve to said delivery device and by-passing said mixing chamber, a third outlet from said valve to said mixing chamber and an outlet from said mixing chamber to said delivery device, said valve being manually adjustable to any one of several positions comprising: positions in which said second outlet is in communication respectively with said inlets while said first outlet is not in communication with an inlet, a further position in which the apparatus is inoperative, and further positions in which the third outlet is in communication respectively with said inlets while the first outlet is in communication with one of said inlets so as to produce in said gas-displacement-container an advancing body of water which displaces gas from said container to said mixing chamber where it intermixes with and aerates water from said third outlet.

A further object of the invention is to provide apparatus for treating water comprising a treatment chamber, a reagent support movable between an operative position and an inoperative position being positions respectively in and out of said chamber, an air-displacement chamber, an outlet therefrom to said treatment chamber, a water inlet, a control valve adjustable between an operative position and in inoperative position being positions respectively allowing and preventing delivery of air and water to said treatment chamber, and a connection between said valve and said support constraining them both to be in inoperative position at the same time.

The above and other objects of the invention will be more fully described with reference to the accompanying drawings, the description being of examples of the invention which are illustrated in the drawings. On the drawings:

Figure 1 is a front elevation of a shower device in accordance with the invention for a bath or the like.

Figure 2 is a corresponding rear elevation.

Figure 3 is a cross sectional elevation of the tank.

Figure 4 is a sectional detail plan view to a larger scale on the line IV—IV, Figure 1.

Figure 5 is a sectional detail view to a larger scale on the line V—V in Figure 1.

Figure 6 is a sectional detail view to a larger scale of the operating handle.

Figure 7 is a plan view of the soap box and valve casing.

Figure 8 is an elevation looking in the direction of the arrow VII in Figure 7.

Figure 9 is an elevation in the direction of arrow IX, Figure 8.

Figure 10 is a plan view of the valve plug.

Figure 11 is an end view thereof and

Figures 12 and 13 are sectional views on the lines XII and XIII in Figure 10.

Referring to the drawings:

Referring to Figs. 1 to 13 which show an apparatus especially for attachment above the side of the bath, 1 is an air displacement chamber (Fig. 3) formed by the sheet metal walls 31 and 32 and 6 is a soap or the like box. The apparatus can be attached to the wall at the side of the bath by the holes 33 in the side walls (Fig. 3).

34 are spray arms (shown in out-of-use position in Fig. 1) which are provided with spray holes 34a and with removable end caps 34b to which cleaning brushes 35 are attached by a wire or the like. The spray arms can therefore be cleaned simply by loosening the caps and passing the brushes up and down. The brushes also help to give a finer foam. The arms 34 are attached to the inner arms 36 by a joint 37 permitting torsional movement of the arms 34 to vary the directions of the jets. As shown more clearly in Fig. 5, the joint 37 comprises a conical valve seat 38 screwed to the arm 36 and engaged by a conical casing member 39 to which the arm 34 is screwed and which has turning arms 40. A compression spring 38a keeps the seat 38 and member 39 in watertight relation irrespective of wear.

The arms 36 are turnably connected to the transverse supply pipe 41 by a joint shown more clearly in Fig. 8 and consisting of a conical sleeve 42 to which the arm 36 is attached and bearing on a conical seat 43 attached to the pipe 41, the seat 43 and sleeve 42 being maintained in watertight relation by the nut 44 engaging the screwed part 43a of the seat 43. Fig. 4 represents the spray arms in horizontal or spraying position with the arm 36 in engagement with the port 43b in the seat 43 but when they are in the dropped position in Fig. 1 the spray is cut off. The nut 44 is adjusted so that there is sufficient frictional engagement between the seat 43 and member 42 to maintain the spraying arms in the raised position. Removable end caps 45 are provided so that the pipe 41 can be cleaned by passing a brush or the like through it from end to end. 43c is an outlet at right angles to the arm 36 and when the arms 36 are raised to vertical position opposite to that in Fig. 1 a supply of foam or water can be obtained without passing through the sprays.

The soap box 6 has a watertight lid 46 hinged by lugs 47 (Fig. 7), and provided with a handle 48 having a curved locking projection 49 which, as shown in Figs. 1 and 2, and 6 is adapted to be engaged by a roller 50 slidably mounted in the forked operating handle 51 by means of a fork 52 urged downwards by a spring 53 (Fig. 6) to keep the lid in watertight engagement. One of the lugs 47 has a projection 47a adapted when the lid is closed to engage under a nut 54 on a pivoted link 55 connected to a vertical link 56 passing down behind the wall 32 and carrying a counterweight 57, or spring, the bottom end of the link 56 passing through a bracket and carrying a cushioning spring 58 (Fig. 2). The lid is provided underneath with a perforated or mesh basket 59 (Fig. 2) open at the end 59a and adapted to receive a perforated drawer 60 for containing the soap or the like and by which the soap can easily be inserted or withdrawn.

When the handle 51 is moved so that the roller 50 clears the member 49 (the handle position then corresponding to conditions not requiring the soap) the lid is automatically raised by the counterweight 57 and connecting linkage to the position shown in chain dotted lines in Fig. 2 so that the soap is clear of the box 6 and is therefore not wasted by being kept immersed in the water and also enables the production of a pure water shower.

Hot and cold water are respectively supplied by the pipes 61 and 62 (Fig. 2) which respectively lead to the ports 61a and 62a of the control valve casing 63 (Figs. 7 to 9). This casing also communicates through port 64 and conduit 64a with the end of the soap box and communicates by port 65 and passages 65a with the pipe 41 which is connected to said sprays. The casing 63 also communicates by port 66 with a pipe 66a leading to near the foot of the tank 1 (Fig. 1). An outlet pipe 67 from near the top of the soap box is connected to the pipe 41 and has a non-return valve 67a therein.

The valve casing 63 is tapered internally to receive a tapered plug 68 (Figs. 10 to 13) having squared ends 69 engaged by the control handle 51. This handle has a tail 70 (Fig. 2) connected by a link 71a with the arm 71b of a drain dock 71 at the bottom of the tank 1. It is also connected by a link 72 with a link 73 slidable in guides 74 at the rear of the wall 32 and carrying a pointer 75 which projects through the top of the wall 31 and co-operates with markings "hot," "cold" (foam) "off," "hot," "cold." The letters A, B, C, D, E respectively denote the positions in Figs. 1 and 2 of the handle 51, pointer 75 and arm 71a corresponding to the positions A, B, C, D, E on the scale.

A rearward projection 72a is provided on the link 72 and is adapted to co-operate with a forward projection 56a on the link 56 when the lid is open and the handle 51 is at positions C, D or E to prevent the handle being returned to positions A or B while the lid 46 is open and cause flooding, it being necessary to push down the lid before the handle can be so returned.

The plug 68 (Figs. 10 to 13) has an internal axial passage 68a communicating with the outside through opposed ports 68b, 68c and right-angled-disposed ports 68d, 68e. It also has a helical port 68f commencing at the line 68g and terminating at the sharp edge 68h.

The top of the tank 1 communicates by a jet passage 76 with the centre of the bottom of the soap box.

In operation when the handle 51 is in the off position C the ports 61a, 62a are closed by the web 68i (Fig. 17) so that there is no inflow of water from the supply pipes 61, 62. As the handle is moved to position D the port 68d starts to overlap the port 61a and a supply of hot water passes from pipe 61 into the interior 68a of the plug 68 and from thence out through port 68b into port 65 and along pipe 41 to give a hot pure water shower, the soap box being cut off by the plug and also by the non-return valve 67a. As the handle passes further round towards position E the port 68d starts to overlap port 62a and cold water passes from pipe 62 into the interior of the plug and out through port 68b into port 65 and thence to the spray arms. In position E a cold shower is given and a hot shower in position D, any desired temperature being attained by positioning the handle between these two positions.

On the other hand when the handle is moved from position C to position B the port 68e overlaps port 62a and when the sharp edge 68h overlaps port 62a cold water passes round the scroll 68f and out port 66 to the tank from which it forces the air as a fine jet into the soap box through the passage 76. Just thereafter port 68c starts to overlap port 64 and cold water passes from the interior of the plug into the soap box at right angles to the air jet and the foam formation commences, the foam passing from the box through pipes 67 and 41 to the spray arms. As the handle passes to position A the port 68e overlaps 61a and hot water passes to the soap box. In position A only hot water passes to the soap box and only cold water in position B and any desired admixture can be obtained in intermediate positions to give the desired temperature of foam shower. It will be observed that the air jet and inlet water are directed against the soap and all these react to produce a fine, soapy foam of great cleaning power. The drain cock 71, owing to the disposition of tail piece 70, link 71a and arm 71b, remains closed while the handle 51 is in positions A and B but opens slightly before the lid 46 is automatically opened at position C in order to relieve the air pressure on the box. The drain cock 71 remains open during positions D and E.

To permit draining of the tank 1 an air valve 88 (Fig. 1) is provided at the top thereof and is normally held closed but is opened by the cam 89 on the handle 51 when in positions C to E.

The box it will be understood is adapted to receive any suitable substance for treating the water.

If desired heating means may be provided in association with the hot water pipe 61 to give hot water when the usual heating system is not functioning.

The control valve 63, 68 may be adapted for push button control.

The apparatus in accordance with the invention may be fitted on a portable stand movable from place to place. In this case the liquid for the mixing chamber and/or for the air displacement chamber is supplied from a gravity tank and a heater may be provided. Such apparatus would be especially suitable for camping or other occasions when a pipe supply of water is not available. For medical purposes a suitable solution may be put into the tank. As an alternative to displacing the air by a rising body of water it may be displaced by a falling weight, or the air or other gas may be supplied from storage cylinders or the like, especially in the case of portable apparatus, to the mixing chamber.

In the claims the reference to aerating a liquid is to be taken as including the treatment of the liquid with gases other than air.

We claim:

1. Apparatus for aerating liquid by intermixing liquid from a source of liquid and a gas, the apparatus comprising a container for said gas, inlet means in said container for admitting liquid from said source so that the gas may be displaced under pressure by the rise of the liquid in said container, a confined mixing chamber, a passage between said container and said chamber for supplying displaced gas from the former to the latter, and means for supplying liquid from said source to said confined chamber simultaneously with the gas so as to cause mixing in said chamber and the production of aerated liquid, a spray device constituting an outlet from said mixing chamber, the spray device being movable between an in-use position and an out-of-use position and comprising a hollow arm formed with radially directed discharge-perforations, and a bearing in which the arm is torsionally adjustable to allow variation of the discharge angle from the arm, a valve controlling the delivery of aerated liquid from said spray device, the valve being opened to allow such delivery by movement of the spray device from out-of-use position to in-use position.

2. Shower producing apparatus comprising a mixing chamber constituting also a receptacle for substance which is a reagent with water, a gas-displacement-container, a passage between said container and said chamber allowing passage of gas from the former to the latter, a shower-delivery device, a control valve, inlets to said valve respectively for hot water and cold water, a first outlet from said valve to said container, a second outlet from said valve to said delivery device and by-passing said mixing chamber, a third outlet from said valve to said mixing chamber and an outlet from said mixing chamber to said delivery device, said valve being manually adjustable to any one of several positions comprising: positions in which said second outlet is in communication respectively with said inlets while said first outlet is not in communication with an inlet, a further position in which the apparatus is inoperative, and further positions in which the third outlet is in communication respectively with said inlets while the first outlet is in communication with one of said inlets so as to produce in said gas-displacement-container an advancing body of water which displaces gas from said container to said mixing chamber where it intermixes with and aerates water from said third outlet.

3. Apparatus for producing an aerated solution of foam comprising a treatment chamber, a reagent support movable between an operative position and an inoperative position being positions respectively in and out of said chamber, an air-displacement chamber, an outlet therefrom to said treatment chamber, a water inlet in said chamber, water supply conduit means connected to said inlet, a control valve on said conduit means and adjustable between an operative position and an inoperative position being positions respectively allowing and preventing delivery of air and water to said treatment chamber, and a connection between said valve and said support causing the support to move to inoperative position when the valve is moved to inoperative position, and outlet means for delivering the solution or foam from said treatment chamber.

4. Shower producing apparatus according to claim 2, wherein the mixing chamber incorporates a hinged-lid, and further comprising a reagent support upheld by said lid, the support being within the chamber when the lid is closed, means urging said lid to a limit open-position which is such that reagent on said support is outside said chamber, and means on the control valve for maintaining the lid closed while the valve is in these positions in which said first outlet is in communication with an inlet.

5. Shower producing apparatus according to claim 2, wherein the mixing chamber incorporates a hinged-lid, and further comprising a reagent support upheld by said lid, the support being within the chamber when the lid is closed, means urging said lid to a limit open-position which is such that reagent on said support is outside said chamber, and means on the control valve for maintaining the lid closed while the valve is in these positions in which said first outlet is in communication with an inlet, and abutment means preventing movement of the valve to said "these positions" while the lid is open.

6. Shower producing apparatus according to claim 2, wherein the gas-displacement-container comprises a flat tank adapted for attachment to a wall, said tank incorporating a drain valve operatively connected with said control valve so as to be open while said valve is in positions in which said first outlet is not in communication with an inlet.

7. A bathroom apparatus for producing a soapy aerated foam comprising a mixing chamber, support means therein for a cake of soap, inlets for water and air, said means and inlets being located so that the air and water are directed on to the soap to react therewith and produce an areated soapy foam, an air-displacement chamber connected to the air-inlet, means for supplying water from the ordinary domestic supply to said air-displacement chamber to displace air as a jet on to the soap in the mixing chamber and simultaneously supplying water from said supply to said mixing chamber, spray means for delivering the soapy foam and valve means to enable the domestic supply to be passed direct to the spray means without contacting with the soap in order to give a pure water shower.

8. Apparatus as claimed in claim 3, in which said chamber incorporates a hinged-lid carrying said reagent support and means urging said lid to inoperative position and in which said connection comprises means on the valve engaging said lid so as to move same to closed position, that is, operative position of said support, when the valve is moved to operative position.

9. Apparatus as claimed in claim 7, having means for automatically dissociating the soap and water when the apparatus is not in use.

10. Apparatus as claimed in claim 7, having valve means for controlling admission of air and water to said chamber and means connecting said support means and valve means to cause the support means to move the soap out of said chamber when the valve means is moved to cut off admission of water to said chamber.

11. Shower producing apparatus according to claim 2, wherein the mixing chamber incorporates a reagent support movable between an operative and an inoperative position being positions respectively in and out of said chamber and wherein connection means is provided between the valve and said support causing the support to be in operative position when the valve is moved to those positions when the third outlet is in communication respectively with said inlets, and water and gas are respectively supplied to said chamber from said inlets and said container.

12. Shower producing apparatus comprising a mixing chamber, a reagent support movably associated therewith and movable between an operative and an inoperative position being respectively positions in and out of said chamber, a shower delivery device, a control valve including a manually operable valve member and casing means therefor, inlets to said casing means respectively for hot water and cold water, a first outlet from said casing means to said delivery device and by-passing said chamber, a second outlet from said casing means to said chamber, an outlet from said chamber to said delivery device and connection means between said valve member and said support, said valve member being manually adjustable to any one of several positions comprising: positions in which said first outlet is in communication respectively with said inlets and the reagent support is in inoperative position, a further position in which the apparatus is inoperative, admission of water at said inlets being cut off, and the reagent support is in inoperative position and further positions in which the second outlet is in communication respectively with said inlets and the reagent support is constrained by said connection means between same and the valve member to be in operative position.

13. Apparatus for producing a solution or foam comprising a reagent treatment chamber, a lid therefor movable between closed and open positions, a reagent support upheld by said lid and being respectively in or outside the chamber when the lid is closed or open, a water inlet in said chamber, water supply conduit means connected to said inlet, a control valve on said conduit means adjustable between an operative and an inoperative position being positions respectively allowing and preventing delivery of water to said chamber, and connection means between the valve and lid causing the latter to move to open position when the valve is moved to inoperative position.

14. Apparatus as claimed in claim 13, comprising means urging the lid to open position and wherein said connection means comprises a member in the valve maintaining the lid closed when the valve is in operative position.

FREDERICK WM. WILLIS.
ALBERT SIMPSON.